United States Patent Office 3,398,006
Patented Aug. 20, 1968

3,398,006
CEMENT COMPOSITION AND PRODUCTS THEREOF
Vincent F. Felicetta and Aaron E. Markham, Bellingham, Wash., assignors to Georgia-Pacific Corporation, Portland, Oreg., a corporation of Georgia
No Drawing. Filed Feb. 24, 1965, Ser. No. 435,057
12 Claims. (Cl. 106—90)

ABSTRACT OF THE DISCLOSURE

A portland cement composition containing an admixture of sulfonated lignin reacted with from 0.01 to 45 weight percent, based upon the dry solids of the sulfonated lignin-containing material, of styrene oxide.

---

This invention pertains to a process for the preparation of a hydraulic cement composition and products thereof. More particularly, it pertains to hydraulic cement and products such as concrete and mortar containing an admixture or additive to impart improved properties.

Different agents are commonly added to hydraulic cement to improve the properties. Additives or admixtures are added to improve the plasticity, increase the strength, entrain air, and to retard the setting as well as to accelerate the setting. Many of the admixtures may impart an improvement to the cement in one particular property but may have an adverse effect upon another property. For example, admixtures are often added to improve the durability by the entrainment of air in the concrete, but usually the desired amount of air entrainment for optimum durability is not used due to the loss in strength of the concrete. Thus, an admixture or additive which will permit a relatively large entrainment of air without an appreciable decrease in strength is very desirable. Furthermore, an admixture which improves the compressive strength of concrete and has an optimum effect on air entrainment and set retardation is of great utility.

It is therefore an object of this invention to provide a cement composition possessing good plasticity and air entrainment properties, products made thereof and a process for the preparation of the compositions and products. A further object is to provide a cement composition having good durability without any appreciable loss in strength. A still further object is to provide a cement composition having optimum air entrainment and set retardation properties and high strength. A still further object is to provide a cement composition and products thereof of sufficiently high air entrainment to produce a product of reduced weight.

The above and other objects are attained according to this invention by intermixing as an admixture in the hydraulic cement a reaction product of a sulfonated lignin-containing material and styrene oxide. The addition of a small amount of the product decreases the water requirement of concrete or mortar without appreciably retarding the setting time and improves the durability of the product. Air entrainment of about 10% in concrete may be obtained with the use of the admixture with strengths being greater than or comparable to that of the plain concrete containing 0.5 to 3% of air.

The reaction product or admixture may be obtained by interacting the styrene oxide with a sulfonated lignin. The interaction of styrene oxide with a lignosulfonate may be carried out by merely intermixing an aqueous solution of a lignosulfonate-containing material with the styrene oxide with or without the use of catalysts, preferably followed by heating to about 50° C. to 200° C. The interaction may be effected under acid, neutral or alkaline conditions. One method by which the product may be prepared is described in U.S. Letters Patent application Ser. No. 211,422, filed July 20, 1962, of Paul Melnychyn, and now abandoned.

The lignosulfonates used in the preparation of the admixture or additive may be obtained by sulfonation of the lignin obtained from any source by the various known methods. One of the main sources of lignosulfonate is the residual pulping liquors of the paper and pulp industries where lignocellulosic materials such as wood, straw, corn stalks, bagasse, and the like are processed to separate the cellulose or pulp from the lignin. In the sulfite pulping process, the lignocellulosic material is digested with a bisulfite or sulfite to obtain a sulfonated residual pulping liquor commonly referred to as "spent sulfite liquor" wherein the sulfonated lignin is dissolved. In other pulping processes, the residual pulping liquor as obtained from the process may not be a sulfonated product. However, the residual liquors or products containing the lignin portion of the lignocellulosic materials from the sulfite or other processes may be treated by the various known methods to sulfonate the lignin to the different degrees desired. For example, the residual liquor obtained in an alkaline process of digestion of lignocellulosic materials such as kraft, soda and other alkali processes may be sulfonated by reacting the product with a bisulfite or sulfite to obtain a sulfonated residual pulping liquor. Likewise, lignins known as "hydrolysis lignin" obtained from the hydrolysis of lignocellulosic materials in manufacturing wood sugars, or "hydrotropic lignins" derived from hydrotropic pulping processes may be sulfonated and used.

The sulfonated lignins obtained by sulfonation of lignin may be salts of certain cations, such as magnesium, calcium, ammonium, sodium, potassium and the like. The lignosulfonates thus obtained may be used as such for the reaction with the epoxide or may be converted to lignosulfonic acid by addition of an acid or by use of ion exchange resins, and used or converted to salts or complexes of metals or other cations other than that obtained in the sulfonation process. Some purification of the sulfonated lignin-containing material is often preferred as this generally reduces the consumption of the epoxide in the reaction.

The lignosulfonate products obtained from the sulfite pulping process or by the sulfonation of other residual pulping liquors or lignin-containing materials usually contain many other constituents besides sulfonated lignin. For example, spent sulfite liquor generally contains about 40 to 60 weight percent of lignosulfonate with the remainder being carbohydrates and other organic and inorganic compounds dissolved in the liquor. The non-lignosulfonate constituents may be removed by the various known methods. For example, carbohydrates may be removed by means such as oxidation, dialysis or fermentation. The removal of some of the constituents, for example, by fermentation of the sugars and recovery of the alcohol thereby produced, may increase the lignosulfonate content in the residual pulping liquor to about 80% of the total solids dissolved in the liquor. Also, heating the pulping liquor under alkaline or acid conditions results in converting certain reactive constituents in the pulping liquor to constituents non-reactive with the epoxide which likewise reduces the epoxide requirement. Further, the acid or alkaline treatment of the pulping liquor may enhance the effectiveness of the admixture prepared from the so-treated pulping liquor. In the alkaline treatment, an alkali metal hydroxide, oxide or carbonate or an alkaline earth metal hydroxide or oxide may be used. Calcium hydroxide is usually preferred.

Generally, a product reacted with from 1 to 25 weight percent of the styrene oxide, based upon the dry solids of the sulfonated lignin-containing material, is preferred. An admixture with improved properties is obtained with a content as little as 0.01% of the epoxide. In general, products with from 5 to about 15% of styrene oxide are especially effective for entraining air. Seldom more than 45 weight percent of styrene oxide, based upon the dry solids of the sulfonated lignin-containing material, is employed. The reaction of the sulfonated lignin with the styrene oxide will generally result in lowering the phenolic hydroxyl content of the sulfonated product. With residual pulping liquors, usually the phenolic hydroxyl content of the liquor is lowered by treatment with the preferred proportion of styrene oxide by an amount of 0.2 to 1 weight percent, based on the sulfonated lignin-containing material solids, and may be reduced to substantially zero by reaction with larger proportions.

The proportion of the lignosulfonate styrene oxide reaction product added to the hydraulic cement may be widely varied, depending on the application or effect desired. Amounts from 0.001 to 2%, based upon the weight of the cement, may be generally used with an amount in the range of from 0.01 to 0.6% being preferred. In the range of 0.01 to about 0.1%, high water reductions result with little or no retardation of the setting time. This amount of the admixture will also improve the air void system so that cement products containing about 8 to 10% of air have greater early strengths, with this relatively large amount of air, than that of plain concrete. If a lightweight mortar or concrete is desired, the air entrainment can be further increased by addition or more admixture, for example, in the range of 0.1 to 0.6 weight percent or higher. If air entrainment is not desired, a product of increased strength is obtained by use of the admixtures with the addition of air detrainers such as tributyl phosphate, alcohols, esters of carbonic or boric acids as well as silicones, and the like. Products can be thus made with a mild set retardation containing 4 to 5 percent of air and having increased compressive strength.

The reaction products of this invention may be added to cement during or after its manufacture or to mortar or concrete mixtures. It is generally preferred to intermix the admixture with the cement during manufacturing so that it will not be necessary to do so in the field. The reaction products may be added just prior to the grinding of the cement in which case their surfactant properties function beneficially to improve the grinding, or, on the other hand, the reaction products may be intermixed with the finished cement.

The following examples further illustrate the invention.

All concrete tests were made in accordance with ASTM specifications at a nominal cement factor of 4.75 sacks per cubic yard. Each concrete mix comprised 26.3 lbs. of Type I Portland cement, 71 to 81 lbs. of fine aggregate, 116 lbs. of coarse aggregate, and sufficient water to give a nominal slump of 3½ inches as measured by a 12-inch cone. The admixture was added as an aqueous solution as part of the mixing water. The coarse aggregate consisted of an equal weight of each of the following size fractions of rounded gravel: ¾ to 1 inch, ½ to ¾ inch, ⅜ to ½ inch and 3/16 to ⅜ inch (pea gravel). The weight of sand or fine aggregate used was adjusted within the limits specified to compensate for the differences in amounts of entrained air. Tests made on the fresh concrete were: slump as indicated, air content with the Press-Ur-Meter (manufactured by Concrete Specialties Co., Spokane, Wash.) and time of setting by Proctor penetration resistance needles in compliance with ASTM C–403. Six 6″ x 12″ concrete cylinders were cast from each mix. Three each were used for the 7 day and the 28 day compressive strength tests, which were conducted in accordance with ASTM C–192.

EXAMPLE I

To illustrate the advantage gained by using an admixture of the reaction product of a sulfonated lignin-containing material and styrene oxide, a series of runs was made in which an admixture was prepared by reacting spent sulfite liquor with styrene oxide. A calcium base spent sulfite liquor was used. The liquor was obtained from the pulping of softwoods and was fermented to convert the fermentable sugars to alcohol and the alcohol was removed by distillation. A solution of the fermented spent sulfite liquor containing about 50 weight percent of the spent sulfite liquor solids was alkaline treated by heating the solution for about 4 hours at 80° to 90° C. at a pH of about 8 obtained by addition of sodium hydroxide.

The alkaline treated spent sulfite liquor was then used for the preparation of the admixture.

The admixture was prepared by mixing the alkaline treated spent sulfite liquor with styrene oxide and sodium hydroxide in an amount of 1.7 to 4 weight percent, respectively, based upon the alkaline treated spent sulfite liquor solids. The mixture was brought to a boil in one hour and then refluxed for 4 hours to effect the condensation reaction. The product thus prepared was used as an admixture in concrete and the results obtained compared to concrete containing no admixture and also to concrete prepared using as a control an admixture prepared by further treating a portion of the alkaline spent sulfite liquor in a manner similar to that used in the preparation of the spent sulfite liquor-styrene oxide reaction product except that no styrene oxide was added.

The pertinent data and results obtained are shown in the table below.

| Run | Admixture | Admixture added (percent of cement) | Cement factor sks./cu. yd. | Slump (in.) | Water redn. (percent) | Air content (percent by vol.) | Time of setting Initial set, hrs:min | Time of setting Final set, hrs:min | Compressive strength (% of plain concrete) At 7 days | Compressive strength (% of plain concrete) At 28 days |
|---|---|---|---|---|---|---|---|---|---|---|
| 1 | Plain concrete | | 4.74 | 3 | | 2.5 | 4:40 | 6:45 | 2,380 | 3,570 |
| 2 | Sulfite liquor | 0.30 | 4.74 | 3¾ | 14 | 4.5 | 6:45 | 8:40 | 3,200 | 4,420 |
| 3 | Sulfite Liquor, 1.7% Styrene Oxide | 0.30 | 4.77 | 3¾ | 21 | 6.1 | 6:50 | 8:50 | 3,420 | 4,510 |

EXAMPLE II

A series of runs was made where admixtures having different proportions of styrene oxide reacted with spent sulfite liquor were used.

A fermented calcium base spent sulfite liquor similar to that described in Example I was used. For Runs 2 and 3, the spent sulfite liquor was alkaline treated by treating about 1800 grams of the liquor solids, as a 49 weight percent solution, with 108 grams of calcium hydroxide which was added as a slurry in 200 milliliters of water. The mixture was heated and maintained at 90° to 94° C. for about 20 hours.

For Runs 4 and 5, the fermented spent sulfite liquor was alkaline treated in a manner similar to that described in Example I. After the alkaline treatment, the spent sulfite liquor was acidified with sulfuric acid, precipitating calcium sulfate. The calcium sulfate was removed by centrifuging after which the liquor was neutralized with NaOH.

In the reaction of styrene oxide with the treated spent sulfite liquor, the alkaline treated liquor was intermixed with the predetermined amount of styrene oxide and about 4% of the sodium hydroxide. The mixture was brought to boil in one hour and then refluxed for about four hours to effect the condensation reaction.

The admixtures so prepared were added to concrete in amounts of 0.05, 0.10 and 0.30 weight percent, based upon the weight of the dry cement. In the run using 0.30 weight percent, 0.005 weight percent of tributyl phosphate was also added as an air detrainer.

The pertinent data and the results obtained are shown in the table below.

of the sulfonated lignin-containing material, of styrene oxide.

| Run | Admixture | Admixture added (percent of cement) | Cement factor sks./cu. yd. | Slump (in.) | Water redn. (percent) | Air content (percent by vol.) | Time of setting | | Compressive strength (% of plain concrete) | |
|---|---|---|---|---|---|---|---|---|---|---|
| | | | | | | | Initial set, hrs:min | Final set, hrs:min | At 7 days | At 28 days |
| 1 | Plain concrete | | 4.75 | 3½ | | 2.4 | 5:00 | 7:00 | 2,180 | 3,550 |
| 2 | Sulfite liquor, 10% styrene oxide | 0.05 | 4.74 | 4 | 14 | 5.9 | 5:00 | 6:30 | 2,600 | 3,740 |
| 3 | do | 0.10 | 4.79 | 3 | 23 | 8.0 | 5:30 | 7:20 | 2,650 | 3,440 |
| 4 | Sulfite liquor, 20% styrene oxide | .10 | 4.70 | 3¼ | 28 | 9.2 | 5:40 | 7:35 | 2,240 | 3,100 |
| 5 | Sulfite liquor, 10% styrene oxide. Plus tributyl phosphate | 0.30 / 0.005 | 4.78 | 4½ | 21 | 6.2 | 6:15 | 7:50 | 3,000 | 4,150 |

What is claimed is:

1. A cement composition comprising portland cement and from 0.001 to 2 weight percent, based upon the weight of the cement, of the reaction product of a sulfonated lignin-containing material with from 0.01 to 45 weight percent, based on the dry solids of the sulfonated lignin-containing material, of styrene oxide.

2. A composition according to claim 1 wherein the sulfonated lignin-containing material is a sulfonated residual pulping liquor.

3. A composition according to claim 2 wherein the sulfonated residual pulping liquor is a spent sulfite liquor.

4. A composition according to claim 3 wherein the spent sulfite liquor is reacted with from 1 to 25 weight percent of styrene oxide, based upon the spent sulfite liquor solids.

5. A composition according to claim 4 wherein the reaction product of spent sulfite liquor and styrene oxide is present in an amount of from 0.1 to 0.6 weight percent, based upon the weight of portland cement.

6. A composition according to claim 1 wherein the sulfonated lignin-containing material is a spent sulfite liquor and is reacted with the styrene oxide until the phenolic hydroxyl content of the spent sulfite liquor is lowered by an amount of about 0.2 to 1 weight percent, based upon the spent sulfite liquor solids.

7. A process for the preparation of concrete and mortar using portland cement which comprises intermixing portland cement, water, aggregate, and an admixture in an amount from 0.001 to 2 weight percent, based upon the weight of the cement, and forming the resulting mixture to a predetermined shape until the mixture has set into a monolithic body, said admixture being the reaction product of sulfonated lignin-containing material with from 0.01 to 45 weight percent, based on the dry solids of the sulfonated lignin-containing material, of styrene oxide.

8. A process according to claim 7 wherein the admixture is a reaction product of spent sulfite liquor with styrene oxide.

9. A process according to claim 8 wherein the spent sulfite liquor is reacted with from 1 to 25 weight percent of styrene oxide, based upon the spent sulfite liquor solids, and is present in an amount of from 0.01 to 0.6 weight percent, based upon the weight of the portland cement.

10. A concrete composition which comprises portland cement, water, aggregate, and from 0.001 to 2 weight percent, based upon the weight of the portland cement of an admixture of the reaction product of sulfonated lignin-containing material with from 0.01 to 45 weight percent, based on the dry solids of the sulfonated lignin-containing material, of styrene oxide.

11. A composition according to claim 10 wherein the admixture is a reaction product of a spent sulfite liquor with from 1 to 25 weight percent of styrene oxide, based upon the spent sulfite liquor solids.

12. A composition according to claim 11 wherein said reaction product is present in an amount of from 0.01 to 0.6 weight percent, based upon the weight of portland cement.

References Cited

UNITED STATES PATENTS

| | | | |
|---|---|---|---|
| 2,854,444 | 9/1958 | Monson et al. | 106—90 |
| 3,008,843 | 11/1961 | Jolly | 106—90 |
| 3,232,777 | 2/1966 | Bush | 106—90 |
| 3,234,154 | 2/1966 | Martin | 106—90 |
| 3,240,736 | 3/1966 | Beckwith | 109—90 |

TOBIAS E. LEVOW, *Primary Examiner.*

SAMUEL E. MOTT, *Assistant Examiner.*